(12) United States Patent
Ravishankar et al.

(10) Patent No.: US 7,199,189 B2
(45) Date of Patent: Apr. 3, 2007

(54) COMPOSITIONS SUITABLE FOR ELASTOMERIC MEMBRANES

(75) Inventors: Periagaram S. Ravishankar, Kingwood, TX (US); Narayanaswami R. Dharmarajan, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 287 days.

(21) Appl. No.: 10/498,643

(22) PCT Filed: Oct. 16, 2002

(86) PCT No.: PCT/US02/33393

§ 371 (c)(1), (2), (4) Date: Jun. 14, 2004

(87) PCT Pub. No.: WO03/050148

PCT Pub. Date: Jun. 19, 2003

(65) Prior Publication Data

US 2004/0260025 A1 Dec. 23, 2004

Related U.S. Application Data

(60) Provisional application No. 60/340,674, filed on Dec. 12, 2001.

(51) Int. Cl.
- C08L 9/00 (2006.01)
- C08L 23/06 (2006.01)
- C08L 23/08 (2006.01)

(52) U.S. Cl. ............... 525/191; 525/232; 525/240

(58) Field of Classification Search ........... 525/191, 525/232, 240
See application file for complete search history.

(56) References Cited

U.S. PATENT DOCUMENTS

| | | | |
|---|---|---|---|
| 4,722,971 A | 2/1988 | Datta et al. | 525/211 |
| 5,242,970 A | 9/1993 | Davis et al. | 524/492 |
| 5,256,228 A | 10/1993 | Davis et al. | 156/157 |
| 5,286,798 A | 2/1994 | Davis et al. | 525/211 |
| 5,370,755 A | 12/1994 | Davis et al. | 156/71 |
| 5,389,715 A | 2/1995 | Davis et al. | 524/505 |
| 5,468,550 A | 11/1995 | Davis et al. | 428/327 |
| 5,571,868 A | 11/1996 | Datta et al. | 525/211 |
| 5,582,890 A | 12/1996 | Davis et al. | 428/57 |
| 5,700,538 A | 12/1997 | Davis et al. | 428/57 |
| 5,854,327 A | 12/1998 | Davis et al. | 524/445 |
| 5,859,114 A | 1/1999 | Davis et al. | 524/490 |
| 5,888,602 A | 3/1999 | Davis et al. | 428/40.1 |
| 6,207,756 B1 * | 3/2001 | Datta et al. | 525/191 |
| 6,329,477 B1 * | 12/2001 | Harrington et al. | 526/65 |
| 6,750,284 B1 | 6/2004 | Dharmarajan et al. | 524/515 |

FOREIGN PATENT DOCUMENTS

| | | |
|---|---|---|
| WO | WO 98/02471 | 1/1998 |
| WO | WO 99/45046 | 3/1998 |
| WO | WO 99/45047 | 9/1999 |
| WO | WO 99/45049 | 9/1999 |

* cited by examiner

Primary Examiner—Nathan M. Nutter

(57) ABSTRACT

This invention relates generally to polymers suitable for making elastomeric films, membranes or sheets. More specifically, this invention is directed to polymers of the ethylene, alpha-olefin, diene terpolymer type that are reactor blends of two components, an amorphous major component and semicrystalline minor component, wherein the viscosity of the major component is less than one fourth the viscosity of minor component. These polymers are particularly suitable for elastomeric membranes such as roofing membranes.

87 Claims, No Drawings

COMPOSITIONS SUITABLE FOR ELASTOMERIC MEMBRANES

This application is the National Stage of International Application No. PCT/US02/33393, filed Oct. 16, 2002, which claims the benefit of U.S. Provisional Application No. 60/340,674, filed Dec. 12, 2001, the entire disclosure of which is hereby incorporated herein by reference.

FIELD OF INVENTION

This invention relates generally to polymers suitable for making elastomeric membranes, films and sheets. More specifically, this invention is directed to polymers of the ethylene, alpha-olefin, diene terpolymer type that are reactor blends of two components, an amorphous major component and semicrystalline minor component, wherein the viscosity of the major component is less than one fourth the viscosity of minor component. These polymers are particularly suitable for elastomeric membranes such as roofing membranes.

BACKGROUND

Elastomeric sheets, membranes and films are used in a variety of applications such as roofing, geo membranes, and pond liners. In the past, polymeric roof sheeting materials in the form of single-ply roofing membranes have been used to cover flat rooftops typically found on industrial or commercial buildings, e.g., factories, hospitals, and school buildings. Owing to the combination of low cost, ease of installation, weather resistance, and good physical properties, ethylene-propylene-(optional)diene terpolymer based compounds ["EP(D)M"] have been used in single-ply thermoset roof membrane formulations. When roof membranes are used to cover a large industrial roof, the ends of the sheets are typically spliced together to form a structurally rigid seam. However, after installation, this seam is constantly subjected to adverse weather conditions, such as thermal stresses, high velocity winds, and moisture. The structural integrity of the seam is an important consideration during installation.

Elastomeric compounds based on EP(D)M polymers need to possess the right combination of processability and physical properties both in the vulcanized and unvulcanized state to satisfy manufacturing and end use application requirements. From a manufacturing standpoint, two noteworthy properties that need to be optimized in the unvulcanized formulation are compound tack and green strength. The uncured elastomeric sheets coming off the calendar roll should possess adequate tack to permit splicing of individual sheets to form a sheet that is several times larger than the calendered sheet in width. The unvulcanized compound should also have adequate green strength to be rolled onto a mandrel without sagging. Tack and green strength are influenced by polymer crystallinity. Tack demands either absence or lower crystallinity while green strength demands higher crystallinity. Design of a single EP(D)M polymer that has these contrasting polymer features to meet the tack and green strength requirements is a synthetic challenge.

Roofing membranes made from physically blended EP(D)M polymers are known. For example, U.S. Pat. No. 5,468,550 describes EP(D)M based roof sheet materials, including physical blends. U.S. Pat. No. 5,654,370 also describes membranes made from physically blended EP(D)M polymers. The present invention provides improved tack and green strength as well as other benefits of blended materials without having to physically mix the polymers.

For additional background, see also U.S. Pat. Nos. 5,854,327, 5,888,602, 5,859,114, 5,582,890, 5,389,715, 5,286,798, 5,370,755, 5,256,228, 5,242,970, 5,700,538, 5,571,868, and 4,722,971; WO 98/02471, WO 99/45046, WO 99/45047, and WO 99/45049; and U.S. application Ser. No. 09/570,969, 60/258,096, and 60/258,131.

SUMMARY

This invention is directed to polymer compositions having units derived from ethylene, alpha-olefin and diene, comprising a metallocene catalyzed reactor blend of: a) 10 to 30 weight percent semicrystalline minor component having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component; wherein the viscosity of the major component is less than one fourth the viscosity of the minor component. This invention is also directed to methods for preparing these polymer compositions, and to articles prepared from such compositions.

DETAILED DESCRIPTION

As noted above, this invention involves polymer compositions suitable for elastomeric membranes, specifically roof sheeting materials. The polymer may be an ethylene, alpha-olefin copolymer; an ethylene, alpha-olefin, diene terpolymer; an EPM polymer; and/or EP(D)M polymer. EP(D)M polymers are terpolymers of ethylene, propylene and diene derived units as defined in ASTM D-1418-94. EPM polymers are copolymers of ethylene and propylene as defined in ASTM D-1418-94.

The polymers of this invention are metallocene catalyzed reactor blends of two components; a semicrystalline minor component and an amorphous major component. As used herein the term "reactor blend" means that the components are blended during the polymerization process rather than after the polymerization process using mechanical means. As used herein the term "semicrystalline" is defined has having a melting point as measured by DSC and a heat of fusion of at least 10 J/g. "Amorphous" is defined as either having an absence of a DSC melting point or having a heat of fusion less than 10 J/g. "Metallocene catalyzed" means that at least one metallocene catalyst as defined below is used during polymerization of the components.

The semicrystalline minor component has from 65 to 75 weight percent ethylene derived units, preferably from 68 to 74 weight percent ethylene derived units, more preferably from 69 to 73 weight percent ethylene derived units based on the total weight of the minor component. Unless otherwise noted, ranges include the beginning and endpoints. If the minor component includes diene, then it contains no more than 10-weight percent diene derived units based on the total weight of the minor component. In a preferred embodiment, the minor component contains 0.5 to 5 weight percent units derived from diene, more preferably from 1 to 4 weight percent diene derived units. Preferably, the diene is a non-conjugated diene illustrative examples of which include: dicyclopentadiene; alkyldicyclopentadiene; 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5,n-propylidene-2-norbornene, and 5-(2-methyl-2-butenyl)-2-norborene. 5-ethylidene-2-norbornene (ENB), 1,4-hexadiene, dicyclopentadiene (DCPD), norbornadiene, and 5-vinyl-2-norbornene (VNB) are preferred. ENB is preferred if a sulfur cure system is going to be used.

The remainder of the minor component totaling 100 weight percent is derived from alpha-olefin units. The alpha-olefin has 3 to 10 carbon atoms, preferably 3, 4 or 6 carbon atoms, more preferably 3 carbon atoms. Thus the minor component is preferably an EP(D)M polymer. The viscosity of the minor component measured by MST (5+4) @ 200° C. is preferably from 20 to 80, more preferably 30 to 70 and even more preferably from 55 to 70.

Mooney viscosity of elastomeric polymers is typically measured according to ASTM D1646-99. For very high molecular weight (MW) rubbers that cannot be characterized using the rotor dimensions and conditions prescribed by ASTM, an internal method is used.

ASTM D1646-99 prescribes the dimensions of the rotor to be used within the cavity of the Mooney machine. This prescription allows a large and a small rotor differing only in diameter. These are referred to as ML (Mooney Large) and MS (Mooney Small). However, EPDM can be produced at such high MW that the torque limit of the Mooney machine can be exceeded using these standard prescribed rotors. In these instances, the test is run using a rotor that is both smaller in diameter and thinner as prescribed below. This Mooney is referred to as MST (Mooney Small Thin). Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4), 200° C. Note that the run time of 4 minutes at the end of which the Mooney reading is taken remains the same as the standard conditions. For the purposes of an approximate conversion between the two scales of measurement, multiply the MST (5+4) 200° C. Mooney value by 5 to obtain the ML(1+4) 125 C. equivalent.

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should be grooved in a crosshatch pattern on the face and edge, with square grooves of 0.8 mm width and depth of 0.25–0.38 mm cut on 1.6 mm centers. These serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

The Mooney viscosity of blends is obtained using the relationship shown in Equation 1 below.

$$\text{Log } ML = n_A \log ML_A + n_B \log ML_B \quad \text{(Equation 1)}$$

Where all logarithms are to the base 10. ML is the Mooney viscosity of a blend of two polymers A and B each having individual Mooney viscosities $ML_A$ and $ML_B$, respectively. The fraction of polymer A in the blend is $n_A$, while the fraction of the polymer B is $n_B$. Using Equation (1) and blends of a high ML polymer (A) with a lower ML polymer (B), it is possible to have blends which have a measurable Mooney viscosity, ML and then calculate the desired $ML_A$.

The amorphous major component has from 60 to 70 weight percent ethylene derived units, preferably from 60 to 68 weight percent ethylene derived units, more preferably from 60 to 66 weight percent ethylene derived units based on the total weight of the major component. If the major component includes diene, then it contains no more than 10 weight percent diene derived units based on the total weight of the major component. In a preferred embodiment, the major component contains 0.5 to 5 weight percent units derived from diene, more preferably from 1 to 4 weight percent diene derived units. Preferably, the diene is as described above for the semicrystalline minor component. The remainder of the major component totaling 100 weight percent is derived from alpha-olefin units. The alpha-olefin has 3 to 10 carbon atoms, preferably 3, 4 or 6 carbon atoms, more preferably 3 carbon atoms. Thus the major component, like the minor component, is preferably an EP(D)M polymer.

The viscosity of the major component is calculated as follows: The ML of the blend and the MST of the minor component are independently measured. The minor component MST is multiplied by 5 to obtain the equivalent ML. Using Equation (1), the major component ML is calculated. The value of major component ML thus obtained is less than ¼ the viscosity of the minor component, preferably from ¼ to 1/20, more preferably from 1/10 to 1/20 the viscosity of the minor component.

Both components will have narrow molecular weight distributions (Mw/Mn), i.e., less than 5, preferably from 2 to 3 and more preferably from 2 to 2.5. And both components may have narrow compositions distributions, i.e., about 90% of the molecules in each component have an average ethylene content within 1% of bulk ethylene. Both components are preferably the same type of polymer, i.e., either an ethylene, alpha-olefin copolymer; an ethylene, alpha-olefin, diene terpolymer; an EPM polymer; EP(D)M polymer. In the most preferred embodiment, both components are EP(D)M polymers containing the same type of diene.

The blend contains from 10 to 30 weight percent minor semicrystalline component and from 70 to 90 weight percent major amorphous component, based on the total weight of the blend. In a preferred embodiment, the major amorphous component makes up from 70 to 85 weight percent of the blend, and the minor semicrystalline component makes up 15 to 30 weight percent of the blend, more preferably the major component makes up from 75 to 85 weight percent of the blend and the minor component makes up from 15 to 25 weight percent of the blend.

Whether from the major component, minor component or both, the diene content of a preferred blend is at least 0.5 weight percent, and preferably ranges from 0.5 to 5.0 weight percent based on the total weight of the blend, more preferably from 1.0 to 4.0 weight percent.

The blend preferably has an overall crystallinity of 1.5 or less (as measured by DSC), more preferably from 0.5 to 1.5. The Mooney Viscosity of the blend measured as ML(1+4) at 125° C. is preferably from 40 to 80, more preferably from 55 to 70. The molecular weight distribution of the blend in one embodiment is narrow, i.e., preferably from 2.0 to 5.0 or from 2.7 to 4.0.

In another embodiment, the blend is substantially free of long chain branching, therefore, the branching index is at least 0.7, more preferably at least 0.8, even more preferably at least 0.9, and most preferably 1.0.

The relative degree of branching in ethylene, alpha-olefin, diene monomer elastomeric polymers is determined using a branching index factor (BI). Calculating this factor requires a series of three laboratory measurements of polymer properties in solutions as disclosed in VerStrate, Gary, "Ethylene-Propylene Elastomers", Encyclopedia of Polymer science and Engineering, 6, 2$^{nd}$ edition (1986). These are: (i) $M_{w,GPC\ LALLS}$, weight average molecular weight measured using a low angle laser light scattering (LALLS) technique in combination with Gel Permeation Chromatography (GPC) (ii) weight average molecular weight ($M_{w,DRI}$) and viscosity average molecular weight ($M_{v,DRI}$) using a differential refractive index (DRI) detector in combination with GPC and (iii) intrinsic viscosity (IV) measured in decalin at 135° C. The first two measurements are obtained in a GPC using a filtered dilute solution of the polymer in trichlorobenzene.

The compositions of this invention may be compounded with various other polymers and/or additives depending on the desired end use. For example, polymers such as other EP(D)M polymers, ethylene-butene copolymers, ethylene-octene copolymers, natural rubber, butyl rubber, propylene homopolymers and copolymers etc.

For roof sheeting, common additives include: various clays and fillers such as carbon black or non-black fillers such as are described in U.S. Pat. No. 5,854,327 and 5,582,890; reinforcing materials, processing oil, extender oil, tackifying resins, plasticizers, antioxidants, antioxidants, waxes, cure packages, stearic acid, zinc oxide, UV stabilizers, flame retardant, crystallinity enhancing polymers as are described in U.S. Pat. Nos. 5,389,715, 5,286,798, and 5,370,755; promoters as are described in 5,256,228; and the like.

Curing can be effected by an of the well known curing systems, including sulfur and sulfur donor cure systems, peroxide cure, and quinone type cure systems. Sulfur and sulfur donor cure systems are generally preferred for roof membrane applications.

Suitable sulfur and sulfur containing cure systems include those containing elemental sulfur along with commonly used sulfur accelerators; n-cyclohexyl-2-benzothiazole sulfenamide, 2-mercaptobenzothiazole, 2,2'-dibenzothiazyldisulfide, tetramethylthiuram disulfide, zinc dimethyldithiocarbamate, dipentamethylenethiuram hexasulfide, tetramethylthiuram monosulfide, ferric domethyldithiocarbamate, zinc-o,o-dibutylphhosphorodithiolate, zinc diethyldithiocarbamate and the like.

Sulfur donor type accelerators may be used in place of elemental sulfur or in conjunction with elemental sulfur. In sulfur cure systems, sulfur is preferably added in the amount of 0.2 phr, with about 0.5 to ⅓ phr being the preferred range. The sulfur and sulfur containing cure systems are added in the range of 1 to 10 phr, more preferably in the range of from 2 to 5 parts per hundred parts of rubber.

The compounding ingredients can be admixed utilizing an internal mixer such as a Midget Banbury Mixer, a type B Banbury mixer and/or a two-roll mill, or other mixers suitable for forming a viscous, uniform mixture. Mixing techniques depend on a variety of factors such as specific type of polymers, fillers, oils, waxes and other ingredients. The ingredients can be added together and mixed in a single step or added incrementally in any order. Better mixing is generally attained by an incremental procedure in which the polymer is added first with little or no oil and the remaining ingredients added in additional increments.

As noted above, the compositions of this invention are reactor blends, meaning that the components are blended during polymerization as opposed to after polymerization using mechanical means. The polymerization may be conducted in single or in multiple reactors arranged in series or parallel.

In each of the reactors, the polymerization is preferably such as to generate a random copolymer, that is to say as random by back-mixing in the reactor as the catalysts selected permit the polymer to be. In a preferred embodiment, ethylene, an alpha-olefin comonomer and optionally diene are copolymerized, under solution phase conditions and in the presence of a metallocene catalyst, to form the minor semicrystalline component in a first reactor. The effluent from the first reactor is directed into a second reactor, where ethylene, an alpha-olefin comonomer that can be the same or different from the alpha-olefin used in the first reactor, and optionally a diene that can be the same or different from the polyene used in the first reactor, are copolymerized in the presence of a metallocene catalyst to form the major amorphous component. The effluent from the second reactor is then subject to finishing to produce a solid, blended composition.

Polymerization is preferably homogeneous solution polymerization in series reactors, using single site catalysts, such as metallocene catalysts. Single site catalysts used in homogeneous solution polymerization provide homogeneous chain length and monomer distribution in the polymers they form. Preferably the single site catalyst has ancillary ligands attached to a metal atom which remains appended under the prevailing polymerization conditions to provide molecular stability, a catalytically active site of constantly and enduring activity. Metallocene catalysts are preferred. The ancillary ligand has a pi-ligand structure, preferably a cyclopentadienyl ring. One or two such rings may be provided. The cyclopentadienyl ring may have hetero-atoms replacing carbons in the ring. Suitable metallocenes are described in detail below. Preferred catalysts are cyclopentadienyl metallocene complexes which have two Cp ring systems for ligands, or are monocyclopentadienyl metallocene catalyst. The metallocene complexes may be activated with an alumoxane, e.g., methylalumoxane (MAO) or a non-coordinating anion (NCA) described further below. Optionally, a scavenger component such as a trialkyl aluminum scavenger may be added to the reactor feed(s) to prevent deactivation of catalyst by poisons and to increase the apparent activity.

The reactors are preferably liquid filled, continuous flow, stirred tank reactors providing full back mixing for random copolymer production. Solvent and monomers are fed to each reactor, and catalyst can be fed to the first reactor or to both reactors. Reactors may be cooled by reactor jackets or cooling coils, autorefrigeration, prechilled feeds or combinations of all three to absorb the heat of the exothermic polymerization reaction. Autorefrigerated reactor cooling requires the presence of a vapor phase in the reactor. Adiabatic reactors with prechilled feeds are preferred in which the polymerization exotherm is absorbed by permitting a temperature rise of the polymerizing liquid. Use of hydrogen to control molecular weight is preferred. The reactor temperature may also be used to influence the molecular weight of the polymer fraction produced. In series operation, this gives rise to a temperature difference between reactors which may be helpful for controlling polymer molecular weight. Reactor temperature is selected, depending upon the effect of temperature on catalyst deactivation rate and polymer properties and/or extent of monomer depletion. Therefore, temperature will be determined by the details of the catalyst system. In general, the first reactor temperature can vary between 0–160° C. with 10–130° C. preferred and 20–110° C. most preferred. Second reactor temperatures will vary from 40–220° C. with 50–140° C. preferred and 60–120° C. most preferred. However catalyst can also be fed to the second reactor when the selected process uses reactors in series. Optimal temperatures can best be achieved, particularly for series operation with progressively increasing polymerization temperature, by using bis cyclopentadienyl catalyst systems containing hafnium as the transition metal, especially those having a covalent, single atom bridge coupling the two cyclopentadienyl rings.

Examples of particular reactor configurations and processes suitable for making the compositions of the present invention are described in detail in WO 99/45049, PCT/US01/32299 filed Oct. 17, 2001, and U.S. Pat. No. 6,319,998 the disclosures of which are incorporated herein by reference.

The polymerizations preferably take place in the presence of a metallocene catalyst. The term "metallocene" and "metallocene catalyst precursor" as used herein shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $(Cp^1R^1_m)R^3_n(Cp^2R^2_p)MX_q$ wherein $Cp^1$ of ligand $(Cp^1R^1_m)$ and $Cp^2$ of ligand $(Cp^2R^2_p)$ are the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0 to 8, preferably 0 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula $(Cp^1R^1_m)R^3_n(Y_rR^2)MX_s$ wherein $R^1$ is, each independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms, $R^3$ is a bridging group, "n" is 0 to 3, M is a transition metal having a valence of from 3 to 6, preferably from group 4, 5, or 6 of the periodic table of the elements and is preferably in its highest oxidation state, Y is a heteroatom containing group in which the heteroatom is an element with a coordination number of three from Group VA or a coordination number of two from group VIA preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of suitable biscyclopentadienyl metallocenes of the type described in group 1 above are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting, examples of preferred bis-cyclopentadienyl metallocenes of the type described in group 1 above are the racemic isomers of:

μ-$(CH_3)_2$Si(indenyl)$_2$M(Cl)$_2$
μ-$(CH_3)_2$Si(indenyl)$_2$M(CH$_3$)$_2$
μ-$(CH_3)_2$Si(tetrahydroindenyl)$_2$M(Cl)$_2$
μ-$(CH_3)_2$Si(tetrahydroindenyl)$_2$M(CH$_3$)$_2$
μ-$(CH_3)_2$Si(indenyl)$_2$M(CH$_2$CH$_3$)$_2$ and
μ-$(C_6H_5)_2$C(indenyl)$_2$M(CH$_3$)$_2$;

wherein M is chosen from a group consisting of Zr and Hf

Examples of suitable unsymmetrical cyclopentadienyl metallocenes of the type described in group 1 above are disclosed in U.S. Pat. Nos. 4,892,851; 5,334,677; 5,416,228;

and 5,449,651; and are described in publication *J. Am. Chem. Soc.* 1988, 110, 6255, all of which are incorporated by reference herein.

Illustrative, but not limiting, examples of preferred unsymmetrical cyclopentadienyl metallocenes of the type described in group 1 above are:

μ-(C$_6$H$_5$)$_2$C(cyclopentadienyl)(fluorenyl)M®$_2$
μ-(C$_6$H$_5$)$_2$C(3-methylcyclopentadienyl)(fluorenyl)M®$_2$
μ-(CH$_3$)$_2$C(cyclopentadienyl)(fluorenyl)M®$_2$
μ-(C$_6$H$_5$)$_2$C(cyclopentadienyl)(2-methylindenyl)M(CH$_3$)$_2$
μ-(C$_6$H$_5$)$_2$C(3-methylcyclopentadienyl)(2-methylindenyl)M(Cl)$_2$
μ-(C$_6$H$_5$)$_2$C(cyclopentadienyl)(2,7-dimethylfluorenyl)M®$_2$ and
μ-(CH$_3$)$_2$C(cyclopentadienyl)(2,7-dimethylfluorenyl)M®$_2$;

wherein M is chosen form a group consisting of Zr and Hf, and R is chosen from a group consisting of Cl and CH$_3$.

Examples of suitable monocyclopentadienyl metallocenes of the type described in group 2 above are disclosed in U.S. Pat. Nos. 5,026,798; 5,057,475; 5,350,723; 5,264,405; 5,055,438 and are described in publication WO 96/002244, all of which are incorporated by reference herein.

Illustrative, but not limiting, examples of preferred monocyclopentadienyl metallocenes of the type described in group 2 above are:

μ-(CH$_3$)$_2$Si(cyclopentadienyl)(1-adamantylamido)M®$_2$
μ-(CH$_3$)$_2$Si(3-tertbutylcyclopentadienyl)(1-adamantylamido)M®$_2$
μ-(CH$_2$(tetramethylcyclopentadienyl)(1-adamantylamido)M®$_2$
μ-(CH$_3$)$_2$Si(tetramethylcyclopentadienyl)(1-adamantylamido)M®$_2$
μ-(CH$_3$)$_2$C(tetramethylcyclopentadienyl)(1-adamantylamido)M®$_2$
μ-(CH$_3$)$_2$Si(tetramethylcyclopentadienyl)(1-tertbutylamido)M®$_2$
μ-(CH$_3$)$_2$Si(fluorenyl)(1-tertbutylamido)M®$_2$
μ-(CH$_3$)$_2$Si(tetramethylcyclopentadienyl)(1-cyclododecylamido)M®$_2$ and
μ-(C$_6$H$_5$)$_2$C(tetramethylcyclopentadienyl)(1-cyclododecylamido)M®$_2$;

wherein M is selected from a group consisting of Ti, Zr, and Hf and wherein R is selected from Cl and CH$_3$.

Another class of organometallic complexes that are useful catalysts for the process describe herein are those with diimido ligand systems such as those described in WO 96/23010. These catalytic polymerization compounds are also incorporated herein by reference. Suitable catalysts are also found in WO 00/105236, EP 842,939, and WO 96/13529.

The term "noncoordinating anion" (NCA) means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Useful noncoordinating anions are those that are compatible, stabilize the metallocene cation in the sense of balancing its ionic charge in a +1 state, yet retain sufficient lability to permit displacement by an ethylenically or acetylenically unsaturated monomer during polymerization. Additionally, useful anions will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. NCA's are preferred because of their ability to produce a target molecular weight polymer at a higher temperature than tends to be the case with other activation systems such as alumoxane.

Descriptions of ionic catalysts for coordination polymerization using metallocene cations activated by non-coordinating anions appear in the early work in EP-A-0 277 003, EP-A-0 277 004, WO92/00333 and U.S. Pat. Nos. 5,198,401 and 5,278,119. These references teach a preferred method of preparation wherein metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated herein by reference.

An additional method of making the ionic catalysts uses ionizing anionic pre-cursors which are initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated herein by reference.

Examples of suitable activators capable of ionic cationization of the metallocene compounds described herein, and consequent stabilization with a resulting noncoordinating anion include:

trialkyl-substituted ammonium salts such as:
triethylammonium tetraphenylborate,
tripropylammonium tetraphenylborate,
tri(n-butyl)ammonium tetraphenylborate,
trimethylammonium tetrakis(p-tolyl)borate,
trimethylammonium tetrakis(o-tolyl)borate,
tributylammonium tetrakis(pentafluorophenyl)borate,
tripropylammonium tetrakis(o,p-dimethylphenyl)borate,
tributylammonium tetrakis(m,m-dimethylphenyl)borate,
tributylammonium tetrakis(p-trifluoromethylphenyl)borate, tributylammonium tetrakis(pentafluorophenyl)borate, and tri(n-butyl)ammonium tetrakis(o-tolyl)borate;

N,N-dialkyl anilinium salts such as:
N,N-dimethylanilinium tetrakis(pentafluorophenyl)borate,
N,N-dimethylaniliniumtetrakis(heptafluoronaphthyl)borate,
N,N-dimethylanilinium tetrakis(perfluoro-4-biphenyl)borate,
N,N-dimethylanilinium tetraphenylborate,
N,N-diethylanilinium tetraphenylborate, and
N,N-2,4,6-pentamethylanilinium tetraphenylborate;

dialkyl ammonium salts such as:
di-(isopropyl)ammonium tetrakis(pentafluorophenyl)borate, and
dicyclohexylammonium tetraphenylborate; and triaryl phosphonium salts such as:
triphenylphosphonium tetraphenylborate,
tri(methylphenyl)phosphonium tetraphenylborate, and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate,
triphenylmethylium tetrakis(pentafluorophenyl)borate,
benzene (diazonium) tetrakis(pentafluorophenyl)borate,
tropillium phenyltris(pentafluorophenyl)borate,
triphenylmethylium phenyl-(trispentafluorophenyl)borate,
benzene (diazonium) phenyl-tris(pentafluorophenyl)borate,
tropillium tetrakis(2,3,5,6-tetrafluorophenyl)borate,
triphenylmethylium tetrakis(2,3,5,6-tetrafluorophenyl)borate,
benzene (diazonium) tetrakis(3,4,5-trifluorophenyl)borate,
tropillium tetrakis(3,4,5-trifluorophenyl)borate,
benzene (diazonium) tetrakis(3,4,5-trifluorophenyl)borate,
tropillium tetrakis(3,4,5-trifluorophenyl)aluminate,
triphenylmethylium tetrakis(3,4,5-trifluorophenyl)aluminate,
benzene (diazonium) tetrakis(3,4,5-trifluorophenyl)aluminate,
tropillium tetrakis(1,2,2-trifluoroethenyl)borate,
triphenylmethylium tetrakis(1,2,2-trifluoroethenyl)borate,
benzene (diazonium) tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl)borate, and
benzene (diazonium) tetrakis(2,3,4,5-tetrafluorophenyl)borate.

Where the metal ligands include halide moieties, for example, (methyl-phenyl) silylene (tetra-methyl-cyclopentadienyl) (tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for alkylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Known alkylalumoxanes are additionally suitable as catalyst activators, particularly for those metallocenes comprising halide ligands. The alumoxane component useful as catalyst activator typically is an oligomeric aluminum compound represented by the general formula $(R-Al-O)_n$, which is a cyclic compound, or $R(R-Al-O)_nAlR_2$, which is a linear compound. In the general alumoxane formula, R is a $C_1$ to $C_5$ alkyl radical, for example, methyl, ethyl, propyl, butyl or pentyl and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Catalyst killer such as water may be added to the effluent of the reactor or reactors, preferably at the last stage prior to finishing, so as to prevent additional, difficult to control polymerization during finishing. It is possible that the catalyst is effectively spent at the end of the polymerization; however, the more active bis-cyclopentadienyl catalysts and NCA's have sufficient stability to remain active even after the polymerization proper has ended. The amount of killer and the manner of its addition are tailored to ensure that just enough is added to ensure a complete kill. Excess killer may have to be removed by scavenger or other means such as atomic sieves or other purification columns to ensure that killers are not recycled and act as poisons in the polymerization process.

Optionally, the process also uses a scavenging compound. Although trialkyl aluminum is the most preferred scavenger, other scavengers may be used as set forth below. The term "scavenging compounds" as used in this application and in the claims is meant to include those compounds effective for removing polar impurities from the reaction solvent. Such impurities can be inadvertently introduced with any of the polymerization reaction components, particularly with solvent, monomer and comonomer feed, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically the scavenging compound will be an organometallic compound such as the Group-13 organometallic compounds of U.S. Pat. Nos. 5,153,157, and 5,241,025, and WO-A-91/09882 and WO-A-94/03506, noted above, and that of WO-A-93/

14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity. The metallocene catalyst component and the activator may be fed to the reactors either separately or premixed.

The catalyst systems especially desirable for polymerization give a combination of high activity, good incorporation of the alpha-olefin and diene into the chain, and polymer molecular weights high enough for elastomer applications at economically attractive reactor temperatures. Catalyst systems particularly preferred for achieving these objectives include $\mu$-$(CH_3)_2$Si(Indenyl)$_2$Hf$(CH_3)_2$, $\mu$-$(CH_3)_2$Si[tetramethylcyclopentadienyl][adamantylamido]Ti$(CH_3)_2$, $\mu$-$(C_6H_5)_2$Si[cyclopentadienyl][fluorenyl]Hf$(CH_3)_2$, and in particular 1,1'-bis(4-triethylesilylphenyl)methylene-(cyclopentadienyl)(2,7-di-tertiary-butyl-9-fluorenyl)hafnium dimethyl.

The compositions of this invention are particularly suitable for roofing membranes, but may find uses in various other applications requiring watertight barriers. As used herein "membrane" includes films and sheets of varying thickness and size. Preferred membrane thickness for roofing membranes range from 0.5 millimeters (mm) to 3 mm, most preferably from 0.75 mm to 2 mm. The membranes of this invention provide remarkable improvements in tack and green strength as the following examples indicate.

EXAMPLES

As used herein, Mooney Viscosity was measured as ML (1+4) at 125° C. in Mooney units according to ASTM D1646-99 and MST is measured as described previously. Table A shows the test methods used for both polymer and compound characterization.

TABLE A

| No | Test | Test Method | Units |
|---|---|---|---|
| | EP(D)M POLYMER AND COMPOUND TESTING | | |
| 1 | EP(D)M Polymer Ethylene Composition | ASTM D3900 | wt. % |
| 2 | EP(D)M Polymer Ethylidene Norbornene Composition | FT-IR | wt. % |
| 3 | Mooney Viscosity | ASTM D1646-94 | Mooney Units (MU) |
| 4 | Mooney Scorch Initial Viscosity Final Viscosity t5 | ASTM D2084-93 | MU MU |
| 5 | Cure Characteristics $M_L$ $M_H$ $t_{s2}$ $t_{c90}$ Cure State (=$M_H$ − $M_L$) Cure Rate | ASTM D2084-93 | minutes dN · m dN · m minutes minutes dN · m dN · m/min |
| 6 | Hardness | ASTM D2240 | Shore A |
| 7 | 100% Modulus | ASTM D 412 | MPa |
| 8 | 300% Modulus | ASTM D 412 | MPa |
| 9 | Tensile Strength | ASTM D 412 | MPa |
| 10 | Elongation | ASTM D 412 | MPa |
| 11 | Tear Strength-Die C | ASTM D 624 | MPa |

TABLE A-continued

| No | Test | Test Method | Units |
|---|---|---|---|
| | EP(D)M POLYMER AND COMPOUND TESTING | | |
| 12 | Peel Adhesion | Described Here | MPa KN/m KN/m |

Viscoelastic properties were measured using a Rubber Process Analyzer, RPA 2000® instrument from Alpha Technologies. The elastic modulus (G'), the loss modulus (G") and tan δ (G"/G') were measured at the lowest shear rate of 0.21 sec$^{-1}$. The temperature for these measurements was 60° C.

Ethylene content is determined according to FTIR according ASTM D3900, and ENB content by FTIR per ASTM method D6047. All percentages are weight percent based on the total weight of the polymer or component as applicable unless otherwise indicated Thermal properties, melting point and crystallinity, were measured by DSC. The samples were pressed out at 125° C. for 10 minutes, annealed at room temperature (21° C.) for 2 days prior to testing. About 6 mg polymer was loaded into the DSC cell. The sample was first cooled to −100° C., held for 2 minutes at this temperature and heated from −100° C. to 125° C. at a rate of 30° C./min. The peak melting temperature and the polymer crystallinity normalized to the heat of fusion of polyethylene were recorded for each sample. Table 2 shows these properties for each polymer used in testing.

All molecular weights are weight average molecular weight unless otherwise noted. Molecular weights (weight average molecular weight ($M_w$) and number average molecular weight ($M_n$) were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times.

The numerical analyses were performed using the commercially available Beckman/CIS customized LALLS software in conjunction with the standard Gel Permeation package.

Table 1 shows the polymer characteristics of the EP(D)M polymers used for these examples. EP(D)M A is a control polymer synthesized using a Vanadium catalyst in a hexane solution process. EP(D)M B-I were prepared as follows using the metallocene catalyst system bis(methyl)(cyclopentadienyl)(di(4-triethylsilyl-phenyl))methyl)-9-(2,7-di-tert-butyl-fluorenyl)hafniumdimethyl.

Polymerizations were carried out in a series of two twenty-eight liter stirred reactors with continuous flow of feeds to the system and continuous withdrawal of products.

All feeds were pumped into the reactors by metering pumps except for the ethylene which flowed as a gas under its own pressure through a mass flow meter/controller. The hexane solvent and monomers were purified over beds of alumina and mole sieves. Reactor temperature was controlled by controlling the chilling of the feed. The reactors were operated liquid full at a pressure of about 2000 kPa.

Ethylene, propylene and ENB feeds were combined into one stream with hexane along with a hexane solution of triisobutyl aluminum scavenger to reduce the level of catalyst poisons. The catalyst (bis(methyl)(cyclopentadienyl)(di (4-triethylsilyl-phenyl))methyl)-9-(2,7-di-tert-butyl-fluorenyl)hafniumdimethyl) and activator (N,N-dimethyl anilinium (tetrakis pentafluorophenyl borate) were premixed in toluene and pumped separately to the reactor. The product from the reactor exited through a pressure control valve and was collected for polymer recovery. The polymer product was recovered from solution at the completion of the polymerization by either steam stripping followed by mill drying or by devolatilizing extrusion and under water pelletization. The range of reactor conditions exemplified in this invention were:

Reactor 1 temperature=40–80 C.
Reactor 2 temperature=110–120 C.
Catalyst Productivity=150,000 g polymer/g catalyst
Production Rate=7–9 Kg/h
Solvent rate to each reactor=45 Kg/h Molecular weight (Mooney viscosity) of the minor and major component shown in Table 1 was controlled by changes to the hydrogen feed to each of the reactors. The amount of minor fraction shown in Table 1 was controlled by varying the monomer feed rates to each of the reactors as well as the catalyst feed rates. The composition of each of the components was controlled by the ratio of monomers in the feed to each of the reactors.

Ethylene content isdetermined according to FTIR ASTM D3900 and ENB content by FTIR ASTM D6047.

Table 3 shows two EP(D)M polymer based formulations vulcanized using a conventional sulfur, primary and secondary accelerator cure system. The ingredients were mixed in a 300 cc Midget Banbury mixer using a total mix time of 3 minutes. An upside down mix protocol (polymer last) was used. The compounded mixture was dumped from the Banbury at temperatures between 137° C. and 148° C. and sheeted in a two roll mill preheated to 66° C.

Tack characteristics of the unvulcanized compounds were evaluated by two methods, one during milling and the other through peel adhesion. The informal method consisted of cutting from the compound a rectangular strip 6 inches (152.4 mm) long and ¼ inch (6.35 mm) wide, folding the piece into two at the center, gently pressing on the folded strip to form a splice, and separating the splices manually. For compounds that had no tack, the splices could be easily separated, while compounds that were hard to separate were said to exhibit good tack.

The formal peel adhesion test consisted of the following steps:

1. The mill roll temperature was set between 180° F. (82° C.) to 200° F. (93° C.) prior to banding the unvulcanized compound.

2. The thickness of the rubber compound was controlled between 60 to 60 mils (1.27 to 1.52 mm) during milling.

3. When the stock became smooth and free of bubbles, it was removed from the mill roll. A Mylar film was placed on the compound side that was in contact with the mill surface.

4. The sample of milled rubber was allowed to equilibrate to 70–77° F. (21–25° C.) and 50±5% humidity. After an hour, a specimen of dimension 1 inch (25.4 mm) by 6 inch (152.4 mm) was cut from the rubber stock.

5. Two 1 inch (25.5 mm) by 6 inch (152.4 mm) strips of milled rubber were placed over each other using a piece of Mylar or release paper to develop a 1 inch insert. Pressure was uniformly applied on the composite by rolling a 1 lb (0.45 Kg) roller back and forth six times. After assembly, the insert was removed and the rubber legs were placed into the clamp of an Instron test fixture.

6. The Instron was calibrated using a 100 lb (45.45 Kg) load cell.

7. The Instron jaws were adjusted to about 1 inch (25.4 mm), and the cross head and chart speed were set at 2 inches/minute (50.8 mm/min).

8. The low, high (peak) and average peel adhesion values were recorded. Peel adhesion is reported as KN/m.

Tables 4, 5 and 6 show the cure characteristics and physical properties of the compounds featuring control EP(D)M A and the experimental EP(D)Ms B, C, D, and E. The cure characteristics and the physical properties were nearly the same in all the compounds. The splice tack performance of the compounds from milled stock is very different. Compounds featuring EP(D)M A and EP(D)M E showed good splice tack, while the other formulations containing EP(D)Ms B through D showed no tack. The peel adhesion test shows that for the EP(D)M A compound, the peel force maximum was 10.3 KN while for EP(D)M B compound (poor tack) the peel force was only 4.5 kN. Compounds which provide good tack typically have low elastic modulus and high tan δ. EP(D)M E has a G' and tan δ comparable to the control EP(D)M A, and as expected tack is comparable as well. Poor results for EP(D)Ms B, C and D may be due to higher overall crystallinity as shown in Table 2, which is believed the result of high ethylene content in the minor component as shown in Table 1.

Tables 7, 8 and 9 show the viscosity and cured physical properties of the control EP(D)M A and the experimental EP(D)Ms F, G, H, and I. The compound viscosity and cure properties are very similar in all formulations. EP(D)Ms F, G and H show higher peel force in peel adhesion test compared to the control. For EP(D)Ms G and H, the failure mode was cohesive as opposed to the adhesive type failure seen in EP(D)Ms A and F. The peel force drops off for EP(D)M I. The crystallinity of the inventive EP(D)Ms F, G, H and I are 1.4%, 1.1%, 1.1% and 1.6% respectively. Thus at the higher crystallinity of 1.6% the peel force is lower than for the others. Reducing the ethylene content of the major component improves tack without compromising other physical properties. The elastic modulus of all formulations featuring the metallocene polymers (EP(D)Ms F, G, H, and I) is lower that the control EP(D)M A. The tan δ values are higher than the control compound. Both these are indicate of improvements in tack, and are consistent with the peel adhesion test results.

TABLE 1

Polymer Properties

| Polymer | Overall | | | Minor Component | | | | Major Component | | |
|---|---|---|---|---|---|---|---|---|---|---|
| | Mooney Viscosity | % C2 | % ENB | MST | % C2 | % ENB | % of blend | Viscosity Fraction | % C2 | % ENB |
| EP(D)M A (Control) | 67 | 69 | 2.9 | N/A | N/A | N/A | N/A | N/A | N/A | N/A |
| EP(D)M B | 70.7 | 66.7 | 2.7 | 48.2 | 75.7 | 0 | 21 | 2/17 | 64.3 | 3.4 |
| EP(D)M C | 67.1 | 67.9 | 2.9 | 83.4 | 76.4 | 2.8 | 21 | 2/35 | 65.6 | 2.9 |
| EP(D)M D | 64.3 | 66.3 | 2.8 | 75.8 | 76.3 | 0 | 21 | 5/81 | 63.6 | 3.5 |
| EP(D)M E | 64.1 | 69.1 | 3.1 | 71.4 | 73.8 | 2.4 | 21 | 1/15 | 67.9 | 3.3 |
| EP(D)M F | 62.9 | 68.3 | 2.9 | 70.3 | 71.9 | 2.9 | 21 | 1/15 | 67.3 | 2.9 |
| EP(D)M G | 67.1 | 66.9 | 2.7 | 70.6 | 71.8 | 2.8 | 21 | 4/57 | 65.6 | 2.7 |
| EP(D)M H | 62.5 | 66.3 | 2.5 | 34.5 | 71.8 | 2.8 | 21 | 7/45 | 64.8 | 2.4 |
| EP(D)M I | 61.3 | 66.9 | 2.6 | 33.8 | 71.6 | 2.9 | 30 | 1/9 | 64.9 | 2.5 |

TABLE 2

Polymer Thermal Properties and MWD

| Polymer | Peak Melting T° C. | Crystallinity % | Mw | Mn | Mw/Mn | Mz/Mn |
|---|---|---|---|---|---|---|
| EP(D)M A (Control) | 42.0 | 0.5 | 198,000 | 86,000 | 2.3 | |
| EP(D)M B | 43.6 | 2.1 | | | | |
| EP(D)M C | 43.2 | 1.6 | 266,800 | 98,000 | 2.7 | 2.2 |
| EP(D)M D | 43.6 | 1.7 | 230,200 | 68,700 | 3.4 | 2.8 |
| EP(D)M E | 41.6 | 0.8 | 290,700 | 98,200 | 3.0 | 2.9 |
| EP(D)M F | 42.1 | 1.4 | | | | |
| EP(D)M G | 42.2 | 1.1 | | | | |
| EP(D)M H | 43.2 | 1.1 | | | | |
| EP(D)M I | 42.2 | 1.6 | | | | |

TABLE 3

Roofing Compound Formulations

| Ingredient | Formulation A (phr) | Formulation B (phr) |
|---|---|---|
| Polymer | 100 | 100 |
| High Strength GPH Black | 81 | 81 |
| High Abrasion Furnace Black | 20 | 20 |
| Coal Filler | 18 | 18 |
| Snobrite Clay | 45 | 81 |
| Paraffinic Process Oil | 78 | 67 |
| Zinc Oxide | 2.25 | 3.00 |
| Stearic Acid | 1.50 | 2.00 |
| Curing Ingredients | 4.20 | 4.10 |

TABLE 4

Roofing Membrane Properties for Formulation A

| Property | Unit | EP(D)M A (Control) | EP(D)M B | EP(D)M C | EP(D)M D | EP(D)M E |
|---|---|---|---|---|---|---|
| Mooney Scorch @ 135° C. Large Rotor | | | | | | |
| Minimum Viscosity | MU | 39 | 40 | 38 | 35 | 36 |
| t5 | min. | 21.2 | 22.7 | 24 | 29.8 | 22 |
| Cure - ODR 160° C., 3° Arc | | | | | | |
| $M_L$ | dNm | 7.3 | 8.5 | 7.0 | 8.5 | 6.4 |
| $M_H$ | dNm | 54.1 | 45.6 | 51.6 | 48.4 | 55.4 |
| $t_{s2}$ | min. | 5.9 | 5.9 | 6.8 | 4.1 | 6.3 |

TABLE 4-continued

Roofing Membrane Properties for Formulation A

| Property | Unit | EP(D)M A (Control) | EP(D)M B | EP(D)M C | EP(D)M D | EP(D)M E |
|---|---|---|---|---|---|---|
| $t_{50}$ | min. | 10.2 | 9.4 | 12.2 | 11.9 | 11.4 |
| $t_{90}$ | min. | 22.7 | 20.2 | 21.1 | 17.1 | 21.4 |
| Rate | dNm/min | 7.3 | 6.6 | 5.8 | 6.3 | 7 |
| $M_H - M_L$ | dNm | 46.8 | 37.1 | 45 | 39.9 | 49.0 |

TABLE 5

Roofing Membrane Properties for Formulation A Continued

| Property | Unit | EP(D)M A (Control) | EP(D)M B | EP(D)M C | EP(D)M D | EP(D)M E |
|---|---|---|---|---|---|---|
| Press Cure 40 min @ 160° C. | | | | | | |
| Hardness | Shore A | 69 | 69 | 68 | 68 | 70 |
| 100% Modulus | MPa | 2.4 | 2.8 | 2.4 | 2.7 | 2.8 |
| 300% Modulus | MPa | 5.9 | 6.8 | 5.6 | 6.6 | 6.5 |
| Tensile Strength | MPa | 9.8 | 10.5 | 10.0 | 9.2 | 10.6 |
| Elongation | % | 569 | 520 | 599 | 482 | 553 |
| Tear-Die C Peak Value | KN/m | 39 | 39 | 37 | 39 | 41 |
| Viscoelastic - 60° C. @ 0.21 sec$^{-1}$ | | | | | | |
| Elastic Modulus, G' | KPa | 140 | 305 | 230 | 282 | 140 |
| Loss Modulus, G" | KPa | 127 | 201 | 165 | 164 | 121 |
| tanδ (G"/G') | | 0.91 | 0.66 | 0.72 | 0.58 | 0.87 |

TABLE 6

Roofing Membrane Properties for Formulation A Continued

| Property | Unit | EP(D)M A (Control 1) | EP(D)M B | EP(D)M C | EP(D)M D | EP(D)M E |
|---|---|---|---|---|---|---|
| Splice Tack On Hot Mill | | good | none | none | none | good |
| Instron Peel Adhesion Force | | | | | | |
| Peel Force (Low) | N | 4.7 | 2.0 | | | |
| Peel Force (High) | N | 10.3 | 4.5 | | | |
| Tear Resistance | KN/m | 0.3 | 0.1 | | | |
| Failure Type | | interface | interface | | | |

TABLE 7

Roofing Membrane Properties for Formulation B

| Property | Unit | EP(D)M A (Control) | EP(D)M F | EP(D)M G | EP(D)M H | EP(D)M I |
|---|---|---|---|---|---|---|
| Mooney Scorch @ 135° C. Large Rotor | | | | | | |
| Initial Viscosity | MU | 59 | 57 | 57 | 57 | 54 |
| Minimum Viscosity | MU | 43 | 45 | 46 | 43 | 42 |
| t5 | min. | 20.0 | 19.5 | 19.6 | 20.0 | 19.9 |

TABLE 8

Roofing Membrane Properties for Formulation B Continued

| Property | Unit | EP(D)M A (Control) | EP(D)M F | EP(D)M G | EP(D)M H | EP(D)M I |
|---|---|---|---|---|---|---|
| Press Cure 40 min @ 160° C. | | | | | | |
| Hardness | Shore A | 70 | 67 | 66 | 68 | 67 |
| 100% Modulus | MPa | 2.4 | 2.4 | 2.2 | 2.3 | 2.3 |
| 300% Modulus | MPa | 4.4 | 4.8 | 4.5 | 4.5 | 4.5 |
| Tensile Strength | MPa | 8.9 | 9.6 | 9.2 | 9.2 | 8.6 |
| Elongation | % | 567 | 569 | 587 | 577 | 538 |
| Tear-Die C Peak | KN/m | 32 | 35 | 34 | 35 | 33 |
| Viscoelastic Prop. 60° C. @ 0.21 sec$^{-1}$ | | | | | | |
| Elastic Modulus, G' | KPa | 152 | 134 | 129 | 127 | 129 |
| Loss Modulus, G" | KPa | 152 | 134 | 129 | 127 | 129 |
| tanδ (G"/G') | | 0.965 | 0.983 | 1.015 | 1.063 | 1.024 |

TABLE 9

Roofing Membrane Properties for Formulation B Continued

| Property | Unit | EP(D)M A (Control) | EP(D)M F | EP(D)M G | EP(D)M H | EP(D)M I |
|---|---|---|---|---|---|---|
| Splice Tack On Hot Mill | | good | good | good | good | marginal |
| Instron Peel Adhesion Force | | | | | | |
| Peel Force (Low) | N | 3.7 | 15.2 | 13.6 | 19.2 | 3.3 |
| Peel Force (High) | N | 9.8 | 18.7 | 18.4 | 20.5 | 9.4 |
| Tear Resistance | KN/m | 9.8 | 18.7 | 18.4 | 20.5 | 9.4 |
| Failure Type | | interface | interface | rubber tear | rubber tear | rubber tear |
| Low Strain Modulus @ 25% strain | MPa | 0.07 | 0.13 | 0.13 | 0.14 | 0.06 |
| Heat Aged: 28 days/116° C. | | | | | | |
| Hardness | Shore A | 80 | 79 | 78 | 79 | 78 |
| Tensile Strength | MPa | 8.7 | 9.0 | 9.2 | 8.6 | 8.5 |
| Elongation | % | 290 | 266 | 290 | 272 | 271 |
| Tear Die C (Peak Value) | KN/m | 35 | 34 | 35 | 33 | 32 |

While the present invention has been described in considerable detail with reference to certain preferred versions thereof, other versions are possible. Also, different types of members and configurations of members can be formed in accordance with the invention, in a number of different ways that will be apparent to persons having ordinary skill in the art. Therefore, the spirit and scope of the appended claims should not be limited to the description of the preferred versions contained herein.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A polymer composition comprising a metallocene catalyzed reactor blend of:
   a) 10 to 30 weight percent semicrystalline minor component having 65 to 75 weight percent ethylene derived units; 0 to 10 weight percent diene derived units; and alpha-olefin derived units having 3 to 10 carbon atoms making up the remainder of the minor component; and
   b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component;
   wherein the viscosity of the major component is less than one fourth the viscosity of the minor component, and wherein the blend has a diene content of at least 0.5 weight percent based on the total weight of the blend.

2. The composition of claim 1 wherein the blend contains 70 to 85 weight percent said amorphous major component, and 15 to 30 percent said semicrystalline minor component.

3. The composition of claim 1 wherein the blend contains 75 to 85 weight percent said amorphous major component, and 15 to 25 percent said semicrystalline minor component.

4. The composition of claim 1 wherein the major component has from 60 to 68 weight percent ethylene derived units.

5. The composition of claim 1 wherein the major component has from 60 to 66 weight percent ethylene derived units.

6. The composition of claim 1 wherein the minor component has from 68 to 74 weight percent ethylene derived units.

7. The composition of claim 1 wherein the minor component has from 69 to 73 weight percent ethylene derived units.

8. The composition of claim 1 wherein the minor component has from 0.5 to 5 weight percent units derived from 5-ethylidene-2-norbornene, 5-vinyl-2-norbornene, or dicylcopentadiene.

9. The composition of claim 1 wherein the major component has from 0.5 to 5 weight percent units derived from 5-ethylidene-2-norbornene, 5-vinyl-2-norbornene, or dicylcopentadiene.

10. The composition of claim 1 wherein the blend has from 0.5 to 5 weight percent units derived from 5-ethylidene-2-norbornene, 5-vinyl-2-norbornene, or dicylcopentadiene.

11. The composition of claim 1 wherein the minor component has from 1 to 4 weight percent units derived from 5-ethylidene-2-norbornene, 5-vinyl-2-norbornene, or dicylcopentadiene.

12. The composition of claim 1 wherein the major component has from 1 to 4 weight percent units derived from 5-ethylidene-2-norbornene, 5-vinyl-2-norbornene, or dicylcopentadiene.

13. The composition of claim 1 wherein the blend has from 1 to 4 weight percent diene units derived from 5-ethylidene-2-norbornene, 5-vinyl-2-norbornene, or dicylcopentadiene.

14. The composition of claim 1 wherein the alpha olefin derived units in both the major and minor components have 3, 4 or 6 carbon atoms.

15. The composition of claim 1 wherein the alpha olefin derived units in both the major and minor components have 3 carbon atoms.

16. The composition of claim 1 wherein the blend has a percent crystallinity of from 0.5 to 1.5.

17. The composition of claim 1 wherein viscosity of the major component is from $1/10^{th}$ to $1/20^{th}$ of the minor component.

18. The composition of claim 1 wherein viscosity of the blend measured as ML (1+4) at 125° C. is from 40 to 80.

19. The composition of claim 1 wherein viscosity of the blend measured as ML (1+4) at 125° C. is from 55 to 70.

20. The composition of claim 1 wherein both the major and minor components have molecular weight distributions of from 2 to 3.

21. The composition of claim 1 wherein both the major and minor components have molecular weight distributions of from 2 to 2.5.

22. The composition of claim 1 wherein the blend has a molecular weight distribution of from 2.0 to 5.

23. The composition of claim 1 wherein the blend has a molecular weight distribution of from 2.7 to 4.

24. The composition of claim 1 wherein the blend is substantially free of long chain branching.

25. A polymer composition having units derived from ethylene, alpha-olefin and diene, comprising a reactor blend of:
   a) 15 to 30 weight percent semicrystalline minor component having 68 to 74 weight percent ethylene derived units, 0.5 to 5 weight percent diene derived units, and units derived from propylene making up the remainder of the minor component; and
   b) 70 to 85 weight percent amorphous major component having 60 to 68 weight percent ethylene derived units; 0.5 to 5 weight percent diene derived units; and units derived from propylene making up the remainder of the major component;

wherein the viscosity of the major component is from $1/20$ to $1/4$ the viscosity of the minor component, and both the major and minor components have a molecular weight distribution in the range of from 2 to 3, and the blend has a percent crystallinity of from 0.5 to 1.5, a viscosity measured as ML (1+4) at 125° C. of from 40 to 80, and a molecular weight distribution of from 2.0 to 5.0.

26. The composition of claim 25 wherein the blend contains 75 to 85 weight percent said amorphous major component, and 15 to 25 percent said semicrystalline minor component.

27. The composition of claim 25 wherein the major component has from 60 to 66 weight percent ethylene derived units.

28. The composition of claim 25 wherein the minor component has from 69 to 73 weight percent ethylene derived units.

29. The composition of claim 25 wherein the minor component has from 0.5 to 5 weight percent units derived from 5-ethylidene-2-norbornene, 5-vinyl-2-norbornene, or dicylcopentadiene.

30. The composition of claim 25 wherein the major component has from 0.5 to 5 weight percent units derived from 5-ethylidene-2-norbornene, 5-vinyl-2-norbornene, or dicylcopentadiene.

31. The composition of claim 25 wherein the blend has from 0.5 to 5 weight percent units derived from 5-ethylidene-2-norbornene, 5-vinyl-2-norbornene, or dicylcopentadiene.

32. The composition of claim 25 wherein the minor component has from 1 to 4 weight percent units derived from 5-ethylidene-2-norbornene, 5-vinyl-2-norbornene, or dicylcopentadiene.

33. The composition of claim 25 wherein the major component has from 1 to 4 weight percent units derived from 5-ethylidene-2-norbornene, 5-vinyl-2-norbornene, or dicylcopentadiene.

34. The composition of claim 25 wherein the blend has from 1 to 4 weight percent diene units derived from 5-ethylidene-2-norbornene, 5-vinyl-2-norbornene, or dicylcopentadiene.

35. The composition of claim 25 wherein viscosity of the major component is from $1/10^{th}$ to $1/20^{th}$ of the minor component.

36. The composition of claim 25 wherein the blend is substantially free of long chain branching.

37. A polymer composition having units derived from ethylene, alpha-olefin and optionally diene, comprising a metallocene catalyzed reactor blend of:
   (a) 10 to 30 weight percent semicrystalline minor component having 65 to 75 weight percent ethylene derived units; 0 to 10 weight percent diene derived units; and alpha-olefin derived units having 3 to 10 carbon atoms making up the remainder of the minor component; and (b) 70 to 90 weight percent amorphous major component having 60 to 70 weight percent ethylene derived units; 0 to 10 weight percent diene derived units; and alpha olefin derived units having 3 to 10 carbon atoms making up the remainder of the major component;

wherein the viscosity of the major component is from 1/20 to 1/4 the viscosity of the minor component, and wherein the diene content of the blend is at least 0.5 weight percent based on the total weight of the blend.

38. The composition of claim 37 wherein the blend contains 70 to 85 weight percent said amorphous major component, and 15 to 30 percent said semicrystalline minor component.

39. The composition of claim 37 wherein the blend contains 75 to 85 weight percent said amorphous major component, and 15 to 25 percent said semicrystalline minor component.

40. The composition of claim 37 wherein the major component has from 60 to 68 weight percent ethylene derived units.

41. The composition of claim 37 wherein the major component has from 60 to 66 weight percent ethylene derived units.

42. The composition of claim 37 wherein the minor component has from 68 to 74 weight percent ethylene derived units.

43. The composition of claim 37 wherein the minor component has from 69 to 73 weight percent ethylene derived units.

44. The composition of claim 37 wherein the minor component has from 0.5 to 5 weight percent units derived from 5-ethylidene-2-norbornene, 5-vinyl-2-norbornene, or dicylcopentadiene.

45. The composition of claim 37 wherein the major component has from 0.5 to 5 weight percent units derived from 5-ethylidene-2-norbornene, 5-vinyl-2-norbornene, or dicylcopentadiene.

46. The composition of claim 37 wherein the blend has from 0.5 to 5 weight percent units derived from 5-ethylidene-2-norbornene, 5-vinyl-2-norbornene, or dicylcopentadiene.

47. The composition of claim 37 wherein the minor component has from 1 to 4 weight percent units derived from 5-ethylidene-2-norbornene, 5-vinyl-2-norbornene, or dicylcopentadiene.

48. The composition of claim 37 wherein the major component has from 1 to 4 weight percent units derived from 5-ethylidene-2-norbornene, 5-vinyl-2-norbornene, or dicylcopentadiene.

49. The composition of claim 37 wherein the blend has from 1 to 4 weight percent diene units derived from 5-ethylidene-2-norbornene, 5-vinyl-2-norbornene, or dicylcopentadiene.

50. The composition of claim 37 wherein the alpha olefin derived units in both the major and minor components have 3, 4 or 6 carbon atoms.

51. The composition of claim 37 wherein the alpha olefin derived units in both the major and minor components have 3 carbon atoms.

52. The composition of claim 37 wherein the blend has a percent crystallinity of from 0.5 to 1.5.

53. The composition of claim 37 wherein viscosity of the major component is from $1/10^{th}$ to $1/20^{th}$ of the minor component.

54. The composition of claim 37 wherein viscosity of the blend measured as ML (1+4) at 125° C. is from 40 to 80.

55. The composition of claim 37 wherein viscosity of the blend measured as ML (1+4) at 125° C. is from 55 to 70.

56. The composition of claim 37 wherein both the major and minor components have molecular weight distributions of from 2 to 3.

57. The composition of claim 37 wherein both the major and minor components have molecular weight distributions of from 2 to 2.5.

58. The composition of claim 37 wherein the blend has a molecular weight distribution of from 2.0 to 5.

59. The composition of claim 37 wherein the blend has a molecular weight distribution of from 2.7 to 4.

60. The composition of claim 37 wherein the blend is substantially free of long chain branching.

61. A membrane comprising the composition of claim 1.

62. A membrane comprising the composition of claim 25.

63. A membrane comprising the composition of claim 37.

64. A method for preparing a composition comprising:

(a) using a metallocene catalyst to prepare in a first reactor an amorphous major component having 60 to 70 weight percent ethylene derived units; 0 to 10 weight percent diene derived units; and alpha olefin derived units having 3 to 10 carbon atoms making up the remainder of the major component;

(b) using in a second reactor a metallocene catalyst in the presence of contents from the first reactor to prepare a semicrystalline minor component having 65 to 75 weight percent ethylene derived units; 0 to 10 weight percent diene derived units; and alpha-olefin derived units having 3 to 10 carbon atoms making up the remainder of the minor component; and (c) recovering from the second reactor a metallocene catalyzed reactor blend of from 10 to 30 weight percent minor component based on the total weight of the blend and from 70 to 90 weight percent major component based on the total weight of the blend wherein the viscosity of the major component is from 1/20 to 1/4 the viscosity of the minor component.

65. The method of claim 64 wherein the blend contains 70 to 85 weight percent said amorphous major component, and 15 to 30 percent said semicrystalline minor component.

66. The method of claim 64 wherein the blend contains 75 to 85 weight percent said amorphous major component, and 15 to 25 percent said semicrystalline minor component.

67. The method of claim 64 wherein the major component has from 60 to 68 weight percent ethylene derived units.

68. The method of claim 64 wherein the major component has from 60 to 66 weight percent ethylene derived units.

69. The method of claim 64 wherein the minor component has from 68 to 74 weight percent ethylene derived units.

70. The method of claim 64 wherein the minor component has from 69 to 73 weight percent ethylene derived units.

71. The method of claim 64 wherein the minor component has from 0.5 to 5 weight percent units derived from 5-ethylidene-2-norbornene, 5-vinyl-2-norbornene, or dicylcopentadiene.

72. The method of claim 64 wherein the major component has from 0.5 to 5 weight percent units derived from 5-ethylidene-2-norbornene, 5-vinyl-2-norbornene, or dicylcopentadiene.

73. The method of claim 64 wherein the blend has from 0.5 to 5 weight percent units derived from 5-ethylidene-2-norbornene, 5-vinyl-2-norbornene, or dicylcopentadiene.

74. The method of claim 64 wherein the minor component has from 1 to 4 weight percent units derived from 5-ethylidene-2-norbornene, 5-vinyl-2-norbornene, or dicylcopentadiene.

75. The method of claim 64 wherein the major component has from 1 to 4 weight percent units derived from 5-ethylidene-2-norbornene, 5-vinyl-2-norbornene, or dicylcopentadiene.

76. The method of claim 64 wherein the blend has from 1 to 4 weight percent diene units derived from 5-ethylidene-2-norbornene, 5-vinyl-2-norbornene, or dicylcopentadiene.

77. The method of claim 64 wherein the alpha olefin derived units in both the major and minor components have 3, 4 or 6 carbon atoms.

78. The method of claim 64 wherein the alpha olefin derived units in both the major and minor components have 3 carbon atoms.

79. The method of claim 64 wherein the blend has a percent crystallinity of from 0.5 to 1.5.

80. The method of claim 64 wherein viscosity of the major component is from $1/10^{th}$ to $1/20^{th}$ of the minor component.

81. The method of claim 64 wherein viscosity of the blend measured as ML (1+4) at 125° C. is from 40 to 80.

82. The method of claim 64 wherein viscosity of the blend measured as ML (1+4) at 125° C. is from 55 to 70.

83. The method of claim 64 wherein both the major and minor components have molecular weight distributions of from 2 to 3.

84. The method of claim 64 wherein both the major and minor components have molecular weight distributions of from 2 to 2.5.

85. The method of claim 64 wherein the blend has a molecular weight distribution of from 2.0 to 5.

86. The method of claim 64 wherein the blend has a molecular weight distribution of from 2.7 to 4.

87. The method of claim 64 wherein the blend is substantially free of long chain branching.

* * * * *